United States Patent [19]

Brown et al.

[11] Patent Number: 4,591,443

[45] Date of Patent: May 27, 1986

[54] METHOD FOR DECONTAMINATING A PERMEABLE SUBTERRANEAN FORMATION

[75] Inventors: Richard A. Brown, Trenton; Robert D. Norris, Cranbury, both of N.J.

[73] Assignee: FMC Corporation, Philadelphia, Pa.

[21] Appl. No.: 669,409

[22] Filed: Nov. 8, 1984

[51] Int. Cl.$^4$ .............................................. C02F 1/72
[52] U.S. Cl. .................................... 210/747; 166/300; 166/307; 166/312; 210/752; 210/759; 210/763
[58] Field of Search ............... 210/601, 606, 620, 627, 210/631, 632, 697, 698, 747, 759, 763, 764, 752; 166/246, 279, 305 R, 307, 310–312, 300; 252/8.55 B, 8.55 D

[56] References Cited

U.S. PATENT DOCUMENTS

| | | | |
|---|---|---|---|
| 3,499,844 | 3/1970 | Kibbel, Jr. et al. | 252/316 |
| 3,529,666 | 9/1970 | Crowe | 166/300 |
| 3,754,599 | 8/1973 | Hummel et al. | 166/312 |
| 3,846,290 | 11/1974 | Raymond | 210/610 |
| 3,896,879 | 7/1975 | Sareen et al. | 166/300 |
| 4,130,501 | 12/1978 | Lutz et al. | 252/186 |
| 4,234,433 | 11/1980 | Rhudy et al. | 166/275 |
| 4,370,241 | 1/1983 | Junkermann et al. | 210/759 |
| 4,388,194 | 6/1983 | Hills | 210/759 |
| 4,401,569 | 8/1983 | Jhaveri et al. | 210/610 |
| 4,440,651 | 4/1984 | Weisrock | 252/8.55 D |
| 4,453,597 | 6/1984 | Brown et al. | 166/312 |
| 4,464,268 | 8/1984 | Schievelbein | 252/8.55 B |
| 4,495,996 | 1/1985 | Meyers et al. | 166/279 |
| 4,524,829 | 6/1985 | Hanlon et al. | 166/274 |

FOREIGN PATENT DOCUMENTS

| | | |
|---|---|---|
| 2533775 | 2/1977 | Fed. Rep. of Germany . |
| 2084560 | 4/1982 | United Kingdom ................ 210/759 |

OTHER PUBLICATIONS

Schumb et al., "Hydrogen Peroxide" Reinhold Publishing Corp., 1955, pp. 411–416, and 613–618.
Canter et al., "Ground Water Pollution Control" Lewis Publishers, 1985, pp. 131–149.
Schroeder, "Biological Relationships" Oligodynamic Press, 1971, pp. 21–51.
The New Encyclopaedia Britannica, vol. 9, Macro, 15th Edition, Benton (1974) Chicago, pp. 109–114.

*Primary Examiner*—Peter Hruskoci
*Attorney, Agent, or Firm*—Richard E. Elden; Robert L. Andersen

[57] ABSTRACT

The present invention is a process to oxidize a contaminant in a permeable subterranean formation by introducing an aqueous treating solution into the formation which solution contains hydrogen peroxide and a compound to control the mobility of the aqueous solution by increasing the viscosity, the density, or modifying the interfacial properties of the aqueous solution within the formation. The aqueous treating solution may also contain stabilizers for the hydrogen peroxide, free radical initiators, or free radical traps. Optionally, the formation may be pretreated to modify the permeability of the formation, to deactivate or remove hydrogen peroxide decomposition catalyst or to uniformly distribute free radical initiators therein.

18 Claims, No Drawings

METHOD FOR DECONTAMINATING A PERMEABLE SUBTERRANEAN FORMATION

This invention relates to a process for decontaminating a permeable subterranean formation by oxidizing the contaminent therein.

The contamination of soil, groundwater, or a subterranean formation is a serious environmental problem. It is estimated that there are in excess of 100,000 leaking underground gasoline storage tanks, and over 50,000 unlined industrial impoundments located above or near usable aquifers. Contaminants may include organic material, such as petroleum products, phenolics, halocarbons, alcohos, alcohols, and inorganic compounds. Prior conventional treatment technology consisted either of removing the contaminated formation material to a secure land fill or pumping of the the groundwater to the surface for treatment. Both of these techniques are limitec in effectiveness and can be very costly. They require long-term operations and are not certain to prevent the contamination from spreading further.

It is well known that many contaminants in a permeable subterranean formation can be rendered innocuous by oxidation. However, the mass transfer of oxygen into a subterranean formation is normally limited by the diffusion of oxygen gas or the solubility of oxygen in water. Therefore, it is normally difficult to introduce sufficient oxygen into a subterranean formation to oxidize a contaminant therein.

U.S. Pat. No. 3,846,290 to Raymond which is incorporated herein by reference teaches a process to eliminate hydrocarbon contaminants from subterranean groundwater by providing nutrients and oxygen thereby promoting biodegradation of a hydrocarbon contaminant by the microorganisms normally present in a subterranean formation. The process of Raymond is not effective for oxidizing compounds in a subterranean formation above the water table, inorganic compounds, or organic compounds present in concentrations which are toxic to the microoganism.

U.S. Pat. No. 4,401,569 to Jhaveri, which is incorporated herein by reference, teaches a process to treat ground and groundwater contaminated with hydrocarbon compounds. The process requires recirculating water through a contaminated subterranean formation thereby leaching the contaminants and reinjecting the oxidized leachant into the formation. The process of the Jhaveri patent is limited to biodegradable organic compounds located near the surface, and obviously cannot be used near structures which could be undermined by the recirculation of large quantitites of leachant. In addition the Jhaveri process requires the installation of tanks or other containers at the surface in which the biooxidation can take place.

In theory, in-situ oxidation of contaminants, by either a biological or a chemical mechanism offers the potential advantage of rendering contaminants harmless in a relatively short period of time at low cost. The problem with in-situ chemical oxidation is in controlling the positioning and the reaction of the treatment chemicals so that they preferentially react with the contaminant to give effective removal of the hazards associated with the contaminants.

An object of the present invention is an improved process to oxidize a contaminant within a permeable subterranean formation.

Another object of the present invention is an improved process to maintain an oxidizing environment within the subterranean formation thereby preventing undesirable anaerobic biological process from generating undesirable toxic products such as vinyl chloride or hydrogen sulfide.

A further object of this invention is an improved process to introduce an effective quantity of an environmentally acceptable oxidizing agent proximate to a contaminant within a subterranean formation whereby the contaminant can be oxidized to a more acceptable form while minimizing the total quantity of the oxidizing agent used.

The present invention provides a process wherein an aqueous treating solution is introduced into a subterranean formation, said aqueous treating solution containing an effective quantity of hydrogen peroxide and a mobility control agent selected from the group consisting of hydratable polymeric materials, interface modifiers, and densifiers thereby modifying the flow of the aqueous treating solution within the subterranean formation. The components of the aqueous treating solution may be introduced into the formation separately, sequentially, or as a complete formulation.

Hydrogen peroxide is a critical component of the aqueous treating solution, not only because it is completely miscible with water but also because it provides at least three possible oxidation mechanisms to oxidize a contaminant, ionic and free radical reactions of hydrogen peroxide and peroxides as well as reactions of elemental oxygen.

For the purpose of this invention it is essential for the hydrogen peroxide concentration to be at least about 0.1% by weight to attain reasonable reaction rates. Although any greater concentration may be used it is desirable to avoid concentrations greater than 20% for safety and economy. The preferable range is from 0.5% to 10%.

The hydrogen peroxide may be incorporated into the aqueous treating solution by any convenient means, either as a solution containing hydrogen peroxide or as a solid "peroxygen" compound which produces a solution of hydrogen peroxide upon contact with an aqueous solution. Suitable peroxygen compounds include sodium perborate, sodium carbonate peroxide, sodium pyrophosphate peroxide, or sodium peroxide. Alternatively, hydrogen peroxide may be generated within the aqueous treating solution by inserting an anode and cathode into the aqueous solution and passing a direct current between the anode and cathode thereby reducing oxygen to hydrogen peroxide at the cathode.

It is critical for the hydrogen peroxide to be distributed within the formation whereby sufficient hydrogen peroxide is located proximate to the contaminant to oxidize the contaminant to a less objectionable form yet minimize the distribution of hydrogen peroxide to portions of the subterranean formation free from the contaminant. It has been found that it is possible to use a mobility control agent such as a hydratable polymeric material, an interface modifier, a densifier, or combinations thereof to modify the flow of the aqueous treating material within the subterranean formation.

Hydratable polymeric materials are known to be useful to control the viscosity of hydraulic fluids in petroleum wells to facilitate the suspension of propping agents or packing agents. It has unexpectedly been found that by varying the viscosity of an aqueous treating fluid that the ratio of the horizontal flow to the vertical flow of the solution can be controlled in a permeable subterranean formation such as sand, gravel, or soil. In a formation containing groundwater it has been found that increasing the viscosity of the aqueous treating solution decreases the rate of diffusion of hydrogen peroxide into the groundwater from the aqueous treating solution and also decreases the rate of flow of the treating solution within the formation. Further, an aqueous treating solution with a very high viscosity can block the flow of groundwater through a contaminated portion of the subterranean formation during decontamination.

One skilled in the art will recognize that it is desirable to reduce the viscosity of the aqueous treating solution containing a hydratable polymeric material to facilitate easy removal thereof from the subterranean formation after the oxidation of the contaminant is completed. It is well known that the viscosity of the hydraulic fluids can be reduced or "broken" within a few hours by oxidizing agents such as catalyzed hydrogen peroxide.

Hydratable polymeric materials are also suitable for use in the present invention when the oxidation will be completed within a relatively short term. Typical polymeric materials useful for this invention include hydratable polysaccharides, polyacrylamides, and polyacrylamide copolymers. Particularly desirable polysaccharides include galactomanan gums, derivatives thereof, and cellulose derivatives. Typical polysaccharides include: guar gums, locust bean gum, karagya gum, sodium carboxymethyl guar, hydroxyethyl guar, hydroxypropyl guar, sodium hydroxymethyl cellulose, sodium carboxymethyl-hydroxyethyl cellulose, and hydroxyethyl cellulose. However, if it is desired that a polymeric material be used which is resistant to breaking in the presence of peroxygen compounds then a cross-linked interpolymer of an alpha-beta lower carboxylic acid as disclosed in U.S. Pat. No. 4,130,501 or the acrylic acid copolymers with polyallyl sucrose as disclosed in U.S. Pat. No. 3,499,844 would be selected. Both of the above patents are incorporated herein by reference.

Optionally, cross-linking agents may be added which increase the maximum temperature at which the hydratable polymers will retain the desired viscosity. These cross-linking agents are well known in the art and include polyvalent metal ions, such as chromium (III), aluminum (III), titanium (IV), and polyvalent anions, such as borates.

The quantity of the hydratable polymeric material used will depend on the viscosity desired for the aqueous treating solution. If a very viscous aqueous treating solution is desired from 10 to 100 kilograms of hydratable polymeric material per cubic meter of aqueous solution would be used. However, if only a moderate viscosity is desired then from 1 to 10 kilograms of hydratable polymeric material may be used.

For the purpose of this invention an "interface modifier" is defined as a compound that is capable either of increasing the capillary rise of the aqueous solution into a porous material or of increasing the ability of the aqueous solution to wet another surface. Surfactants which are known to reduce the surface tension of an aqueous solution are interface modifiers.

Surfactants can have the added benefit of preventing clays from swelling and dispersing material through the contaminated area and decreasing the activity of metals with respect to peroxide decomposition. Desirably from 0.5 kg to 40 kg of a surfactant is used per cubic meter of aqueous treating solution.

Soluble salts of orthophosphoric acid and soluble salts of condensed phosphonic acid have unexpectedly been found to increase the capillary rise of an aqueous solution into a porous material, therefore, and are also compounds which modify interfacial properites according to the present invention. For the purpose of this invention the soluble salts of orthophosphoric acid and the soluble salts of a condensed phosphoric acid will be referred to simply as "phosphate salts." Phosphate salts do not affect the surface tension of aqueous solutions. However, phosphate salts and surfactants both function as mobility control agents by increasing the capillary fringe above a water table thereby distributing the hydrogen peroxide contained in the aqueous treating solution proximate to a contaminant in the permeable subterranean formation above the water table. Desirably the usage rate of a phosphate salt is 0.5 kg to 40 kg per cubic meter.

A salt which, when dissolved in an aqueous solution, increases the density thereof is frequently referred to as a "densifier." Densifiers are used in well completion fluids to balance the hydrostatic pressure of a formation against the column of completion fluid in a well bore. By using a densifier to increase the density of an aqueous treating fluid it has been found that the mixing of the aqueous treating fluid with the groundwater is minimized. Therefore when a contaminant is located in a subterranean formation such as at the bottom of an aquifer or in the bottom layer of a subterranean body of water the addition of a densifier to the aqueous treating solution will distribute the aqueous treating solution containing hydrogen peroxide to the contaminant thereby minimizing the proportion of aqueous treating fluid distributed to portions of the subterranean formation free from the contaminant. Densifiers commonly used for hydraulically treating wells include sodium chloride, zinc chloride, calcium chloride, and sodium bromide. These salts may be useful as densifiers in the process of the present invention. However, it is more desirable to use a soluble salt of orthophosphoric acid or of a condensed phosphoric acid as a densifier.

Combinations of two or more mobility control agents may be desirable to distribute hydrogen peroxide contained in an aqueous treating solution proximate to a contaminant in a subterranean formation, for example, a hydratable polymeric material and a densifier, an interface modifier and a hydratable polymeric material, or a surfactant and a hydratable polymerial material.

Optionally a free radical activator (also called an "initiator") or a free radical trap (also called a "scavenger" or "inhibitor") may be incorporated into the aqueous treating solution if it is desired that an ionic or a free radical mechanism predominate. A combination of a free radical activator and a free radical trap may be particularly desirable when it is desired to delay the generation of free radicals until after the aqueous treating solution is introduced into the aqueous formation so that hydroxyl free radicals, when generated, are proximate to the contaminant. Alternatively, such a combination may be employed when it is desired that an ionic mechanism predominate initially to oxidize a contaminant and a free radical mechanism predominate subsequently either to depolymerize a hydratable polymeric material or to oxidize a second contaminant.

Free radical activators may be any transitional metal, preferably copper or iron, which can be present in the aqueous treating solution either as a simple ion or as a coordination compound. The desired usage rate of free radical activators will depend on many factors and can be determined by one skilled in the art without undue experimentation.

Free radical traps for peroxygen systems are also well known to those skilled in the art and include hydroxyphenols, amines, and polymerizable monomers which do not tend to form long chains. The latter include unsaturated alcohols and allylic compounds such as allyl alcohol. When both a free radical activator and a free radical trap are desired in an aqueous treating solution compounds capable of both complexing the metal ion and acting as an inhibitor are preferred. Such compounds include: catechol, and 9,10-orthophenanthroline. Preferable free radical traps or inhibitors are allyl alcohol, catechol, 9-10-orthophenanthroline, butene-1,4-diol, phenol, resorcinol, and hydroquinone.

The usage of the free radical scavengers will vary according to the efficacy of the compounds and the desired conditions of use. Generally, from 0.01 to 5 parts of a free radical scavenger are added per hundred parts of the aqueous treating solution; preferably 0.05 to 0.5 parts of the scavenger is added per hundred parts of aqueous treating solution.

It is critical for the present invention to avoid decomposition of sufficient hydrogen peroxide within the subterranean formation to retard or block the distribution of the aqueous treating solution proximate to the contaminant. Optionally a stabilizer for the hydrogen peroxide may be added to the aqueous treating solution. Suitable stabilizers are well known to those familiar with the art and are taught by Schumb et al, *Hydrogen Peroxide*, Reinhold Publishing Corporation, New York (1955) which is incorporated herein by reference in its entirety.

For optimum results it may be critical for the subterranean formation to be pretreated either to minimize decomposition of hydrogen peroxide or to distribute a free radical activator or a hydrogen peroxide decomposition catalyst uniformly within the contaminanted area. This may be accomplished by introducing a pretreatment fluid into the formation. To minimize the decomposition of hydrogen peroxide, the pretreatment fluid may contain a compound which inactivates a hydrogen peroxide decomposition catalyst by reacting with the decomposition catalyst, by complexing the decomposition catalyst, by dissolving and/or removing the decomposition catalyst or by deactivating catalytically active surfaces of the permeable subterranean formation. An organic or inorganic complexing agent or chelating agent is particularly desirable for use in a penetrating fluid. Suitable pretreatment fluids can be easily selected by one skilled in the art by referring to Schumb et al and the prior art. Phosphate salts are particularly desirable for incorporation into pretreatment fluids. Orthophosphate salts are known to precipitate many catalysts for hydrogen peroxide or precipitate on catalytically active surfaces. Salts of condensed phosphates, particularly pyrophosphate salts are well known as stabilizers for peroxygen systems, and other condensed phosphates are well known to be suitable to complex, inactivate, or solubilize polyvalent ions which include decomposition catalysts for hydrogen peroxide. A free radical inhibitor may also be incorporated into the pretreatment fluid to minimize hydrogen peroxide decomposition.

Pretreatment of a permeable subterranean formation may also be desirable to either improve the permeability of a formation containing clays or block the flow of aqueous treating solution to a portion of the formation not containing a contaminant. Pretreatment with fluids containing potassium phosphate and surfactants is particularly desirable to improve the permeability of a formation containing a clay while pretreatment with sodium salts or other clay swelling agents is desirable to block the aqueous treating solution from contact with an uncontaminated portion of a formation.

It is particularly desirable to incorporate phosphate salts into an aqueous treating solution and/or a pretreating fluid because the phosphate salts are useful as pH buffers and provide the multiple function as a stabilizing agent, a mobility control agent, a complexing/precipitating agent, and a surface deactivator.

The following examples are presented to instruct one skilled in the art of the best mode of practicing the present invention and are not intended to limit the scope of the invention.

EXAMPLE 1

The effect of mobililty control agents for modifying the distribution of an aqueous treating solution within a porous subterranean formation was demonstrated by adding 1 g/l of a polyol surfactant (Pluronic TM F87) and 0.1 g/l carboxyvinyl polymer hydratable polymeric material (Carbopol TM 940) to a 1% solution of hydrogen peroxide. Ten ml of the solution was allowed to flow onto a bed of dry sand. The wetted sand had an average diameter and depth of 5.1 cm by 1.9 cm compared with 3.8 cm by 3.2 cm observed for a 1% hydrogen peroxide solution without the mobility control agents.

EXAMPLE 2

Aqueous treating solutions containing 1% hydrogen peroxide were prepared according to Table I to demonstrate the relative effect of common hydratable polymeric materials on an aqueous solution of hydrogen peroxide. Viscosities are reported in arbitrary units using a NL Baroid Rheometer at 600 rpm. The hydratable polymeric materials used were a hydroxypropyl guar (Celanese WSP-05-1001-01), a carboxymethyl cellulose (Hercules CMC-6-CT-L), and a polyacrylamide (Cort 320).

EXAMPLE 3

The effect of free radical activators and inhibitors on the rate of breaking of aqueous treating solutions was determined using the same concentration of hydratable polymeric material used in Example 2. Experimental conditions and observations are presented in Table II.

The stability of hydrogen peroxide was determined in the hydroxypropyl guar and carboxymethyl cellulose solutions. After 18–24 hours at least 90% of the initial hydrogen peroxide was still retained both in the absence and presence of the sodium nitrite.

EXAMPLE 4

The effect of controlling the mobility of an aqueous treating solution by increasing the specific gravity of the solution with a densifier was demonstrated by adding 50 ml of a 4.1% solution of hydrogen peroxide to 450 ml of water in a 600 ml tall-form beaker. The concentrations of hydrogen peroxide from the top and at the bottom of the beaker were found respectively to be 0.38% and 0.55%. When a similar solution saturated with potassium tripolyphosphate was added the concentrations of hydrogen peroxide were found to be 0.38% and 0.61% respectively.

EXAMPLE 5

The effect of a surfactant as a mobility control agent was demonstrated by measuring the change of capillary rise of an aqueous treating solution in a sand column. Four 457 mm long 15 mm ID glass columns were filled with 100 g Marietta sand on top of a glass wool plug. The tubes were immersed with 25.4 mm of sand below the surface of the test liquids and the height of capillary rise in tubes was measured with time as reported in Table III. Unexpectedly it was observed that both orthophosphates and condensed phosphates were very effective mobility control agents. The solutions tested were tap water, an orthophosphate solution containing 0.4 g/l $KH_2PO_4$, 0.6 g/l $Na_2HPO_4$, g/l $NH_4Cl$, 0.2 g/l $MgSO_4$, and 0.02 g/l $MnSO_4.H_2O$, a condensed phosphate solution containing 1 g/l $NH_4Cl$, and 1 g/l $Na_5P_3O_8$, and 1 g/l carboxyvinyl polymer surfactant (Pluronic ™ F87).

EXAMPLE 6

Hydrogen peroxide was demonstrated to be effective as a pretreatment fluid by the following simulation. Approximately 50 grams of a soil containing clay was placed in a 100 ml beaker. The soil was slurried for 30 seconds with 100 ml of 0.1% hydrogen peroxide. Aliquots of the liquid phase were analyzed for hydrogen peroxide content after 3 and 15 minutes. The hydrogen peroxide was decanted and another 100 ml of the hydrogen peroxide solution added and analyzed as before. The process was repeated for a total of six cycles. The results appear as Table IV and show the hydrogen peroxide stability increased with successive cycles.

EXAMPLE 7

The effect of a multiple step pretreatment, as shown in Table V, was demonstrated using the following technique:

Pretreatment—A 40 g sample of a soil containing clay was soaked at 20° C. in 100 ml of a 0.5% solution of an additive and after 16 hours the pretreatment fluid was decanted.

(A1)—The soil from the preliminary treatment was slurried with 100 ml of 0.1% $H_2O_2$ and after 2 hours standing the assay of the supernatant solution was recorded in Table V and the solution was decanted.

(A2)—The soil from step A1 was slurried with another 100 ml portion of 0.1% $H_2O_2$ and the assay of the supernatent solution was determined after 1, 2, and 18 hours.

Treatment B1 and B2 —The treatments were the same as the A1 and A2, except that the solution used in step B2 contained 0.04% $KH_2PO_4$, 0.06% $Na_2HPO_4$, 0.1% $NH_4Cl$, and 0.1% $H_2O_2$ to improve the stability of the hydrogen peroxide in the aqueous treating solution.

It is well known from chapter 7 of Schumb et al, that hydrogen peroxide is a versatile oxidizing agent. Table VI lists a few typical compounds which are oxidized by hydrogen peroxide and typical preferred conditions.

The following examples illustrate how a contaminated site would be treated according to the present invention.

EXAMPLE 8

A 100 m$^3$ site is found to be contaminated with 0.2 kg phenol per cubic meter. The contaminant is located in a coarse sandy aquifer above a confining layer in which flow rates of 200 1/min are possible. The site is prepared by placing injection wells/or galleries up gradient of the contaminant, screened at the saturated zone, and a pumping well down gradient also screened at the saturated zone. The site is then preflushed with a solution containing 20 ppm ferrous sulfate adjusted to a pH of 4. The preflush is continued until the pH at the recovery well is below 6. At this point a 1% hydrogen peroxide solution containing at least 500 mg/l total phosphates, pH adjusted to 5-6, is added to the injection wells.

The pumping/injection rate is balanced at 50 liters/min. If preliminary soil tests of the site show that peroxide decomposition is 20-50% over the first hour the adjusted minimum peroxide requirement would be 12.8-20.4 thousand litre hydrogen peroxide addition is continued until the phenol level is decreased to acceptable levels.

EXAMPLE 9A

If the phenol contamination were located in a highly permeable sand above the water table an important consideration would be to maximize the horizontal spread of the peroxide solution. If the phenol contamination was 1.83 meters below ground level injection of a thickened 1% $H_2O_2$ aqueous treating solution having a viscosity of 35 cps (having a horizontal to vertical flow of 2.7:1) through 0.3 M deep injection wells on a 4.2 meter spacing would provide sufficient horizontal flow to cover the contaminant. Any hydratable polymeric material would be accepted as a thickening agent.

EXAMPLE 9B

Alternatively if the phenol contamination were located just above the confining barrier and in the saturated zone, more efficient treatment could be obtained by using a densified treatment fluid. In this case the addition of high levels of ortho and pyrophosphates would be introduced to the treatment solution to pH 5. Placement of the injection and recovery wells in close proximity to the confining layer would also be desirable.

TABLE I

| Viscosity of Aqueous Treating Solutions Containing 1% Hydrogen Peroxide | | | | | | | |
|---|---|---|---|---|---|---|---|
| Polymer | | Relative Viscosity | | | | | |
| g/l | Type | Initial | 1 hr | 3 hr | 6 hr | 18 hr | 24 hr |
| 6.1 | Hydroxypropyl guar | 54 | 53 | — | — | 22 | 8 |
| 5.0 | Carboxymethyl cellulose | 9 | 7 | 5.5 | — | — | 2 |
| 1.7 | Polyacrylamide | 17.5 | 13 | 7.7 | 4.5 | — | — |

TABLE II

| Effect of Inhibitors and Accelerators on Aqueous Treating Solution (1% $H_2O_2$) | | | | | | | | |
|---|---|---|---|---|---|---|---|---|
| Polymer | | Additive | | Relative Viscosity | | | | |
| g/l | Type | g/l | Type | Initial | 1 hr | 3 hr | 6 hr | 18 hr | 24 hr |
| 6.1 | HPG | .83 | $NaNO_2$ | 54 | 54 | — | — | 120 | 260 |

TABLE II-continued

Effect of Inhibitors and Accelerators on Aqueous Treating Solution (1% H$_2$O$_2$)

| Polymer | | Additive | | Relative Viscosity | | | | | |
|---|---|---|---|---|---|---|---|---|---|
| g/l | Type | g/l | Type | Initial | 1 hr | 3 hr | 6 hr | 18 hr | 24 hr |
| 5.0 | CMC | .83 | NaNO$_2$ | 8 | 9 | 13 | — | — | 14 |
| 1.7 | PAA | 10.0 | 1,4-BD | 18 | 19 | 30 | 54 | — | — |
| 1.7 | PAA | 0.7 | FeSO$_4$ | 18 | 4 | — | — | — | — |

HPG = Hydroxypropyl Guar
CMC = Carboxymethyl Cellulose
PAA = Polyacrylamide
1,4-BD = 1,4-but-2-enediol

TABLE III

Capillary Rise of Aqueous Treating Solutions

| Solution | Capillary Rise (mm) | | |
|---|---|---|---|
| | 30 min. | 60 min. | 180 min. |
| Tap Water | 89 | 89 | 89 |
| Orthophosphate Solution | 133 | 140 | 152 |
| Condensed Phosphate Solution | 146 | 159 | 171 |
| Surfactant | 121 | 127 | 127 |

TABLE IV

Effect of H$_2$O$_2$ Preflush on H$_2$O$_2$ Stability

| Cycle | % of Original H$_2$O$_2$ Remaining After | |
|---|---|---|
| | 3 minutes | 15 minutes |
| 1 | 11 | 2 |
| 2 | 19 | 3 |
| 3 | 28 | 6 |
| 4 | 23 | 7 |
| 5 | 39 | 16 |
| 6 | — | 41 |

TABLE V

Effect of Pretreatment of Soils on H$_2$O$_2$ Stability

| Run | Pretreatment Agent | Treatment A | | | | | Treatment B | | | | |
|---|---|---|---|---|---|---|---|---|---|---|---|
| | | % H$_2$O$_2$ Remaining | | | | Final pH | % H$_2$O$_2$ Remaining | | | | Final pH |
| | | A1 2 Hr | A2 1 hr | A2 2 Hr | A2 18 Hr | | B1 2 Hr | B2 1 Hr | B2 2 Hr | B2 18 Hr | |
| 1 | None | 50 | 60 | 50 | 20 | 6.9 | 70 | 80 | 70 | 30 | 6.7 |
| 2 | ethylenediaminetetraacetate | 100 | 100 | 80 | 70 | 5.1 | 100 | 90 | 90 | — | 5.2 |
| 3 | sodium tripolyphosphate | 40 | 90 | 60 | 30 | 8.2 | 70 | 100 | 90 | 70 | 7.0 |
| 4 | nitrilotriacetate sodium salt | 30 | 50 | 30 | 10 | 8.4 | 70 | 80 | — | 30 | 7.1 |
| 5 | soda ash | 20 | 20 | 10 | 0 | 10.3 | 50 | 70 | 60 | 20 | 8.3 |
| 6 | long chain polyphosphate | 50 | 90 | 70 | 10 | 7.6 | 90 | 100 | 100 | 50 | 6.9 |
| 7 | triethanol amine | 30 | 20 | 10 | 10 | 10 | 55 | 80 | 60 | 20 | 8.0 |

TABLE VI

Treatment Conditions for Various Compounds

| Compounds | Weight Ratio of H$_2$O$_2$ to Compound | pH | Catalyst | Minutes Minimum Contact Time |
|---|---|---|---|---|
| H$_2$S | 1:1 | <6.5 | Fe$^{+2}$ | 5 min. |
| HS$^-$ | 1.03:1 | 6.5–7.5 | Fe$^{+2}$ | 1 min. |
| S$^{-2}$ | 4.25:1 | >8 | Fe$^{+2}$ | 2 min. |
| RSH, RSSR | >5:1 molar | >8 | Fe$^{+2}$ | 5 min. |
| RSR | >2:1 molar | 2–6 | Fe$^{+2}$ | 1–2 hrs. |
| hydroquinone | 4:1 | <6.5 | — | 5 min. |
| CN$^-$ | 1.3:1 | 8.5–10 | Cu$^+$ | .5–1 hr. |
| formaldehyde | 2.3:1 | >8 | — | 5 min. |
| phenol | 5.06:1 | 5–6 | Fe$^{+2}$ | 10 min. |

What is claimed is:

1. A process for chemically oxidizing a contaminant in a permeable subterranean formation containing groundwater comprising introducing an aqueous treating solution into the formation said aqueous treating solution comprising 0.1% to 20% hydrogen peroxide and from 1 to 100 kilograms of a hydratable polymeric material per cubic meter of aqueous treating solution to provide sufficient viscosity to modify the distribution of the aqueous treating solution within the subterranean formation to provide sufficient hydrogen peroxide proximate to the contaminant to oxidize the contaminant to a less objectionable form yet minimize the distribution of hydrogen peroxide to portions of the subterranean formation free from the contaminant.

2. The process of claim 1 further including incorporating 0.5 to 40 kilograms per cubic meter of a surfactant into the aqueous treating solution thereby modifying the interfacial properties of the aqueous treating solution.

3. The process of claim 1 further including incorporating 0.5 to 40 kilograms per cubic meter of a phosphate salt into the aqueous treating solution thereby modifying the interfacial properties of the aqueous treating solution.

4. The process of claim 1 further including incorporating 0.5 to 40 kilograms per cubic meter of a densifier into the aqueous treating solution.

5. The process of claim 1 further including incorporating 0.5 to 40 kilograms per cubic meter of a phosphate salt as a densifier into the aqueous treating solution.

6. The process of claim 1 wherein an aqueous pretreatment fluid is introduced into the subterranean formation prior to the introduction of the aqueous treating solution, said pretreatment fluid comprising a compound selected from the group consisting of a hydrogen peroxide decomposition catalyst, a chelating agent, a free radical activator, and a phosphate salt.

7. The process of claim 6 wherein the aqueous pretreatment fluid comprises a phosphate salt.

8. The process of claim 6 wherein the aqueous pretreatment fluid comprises a free radical activator.

9. The process of claim 6 wherein the aqueous pretreatment fluid comprises a chelating agent.

10. The process of claim 6 wherein the aqueous pretreatment fluid comprises a potassium salt of phosphoric acid.

11. The process of claim 6 wherein the aqueous pretreatment fluid also comprises hydrogen peroxide.

12. Tne process of claim 6 wherein the aqueous pretreatment fluid comprises a hydrogen peroxide decompositin catalyst.

13. The process of claim 6 wherein the aqueous pretreatment fluid also comprises a free radical inhibitor.

14. The process of claim 13 wherein the free radical inhibitor is a compound selected from the group consisting of allyl alcohol, catechol, 1,10-orthophenanthrolene, butene-1, 4-diol, phenol, resorcinol, and hydroquinone.

15. The process of claim 6 wherein the awueous pretreatment fluid comprises a free radical activator and a free radical inhibitor.

16. The process of claim 15 wherein the free radical activator is a compound selected from the group consisting of an iron salt a copper salt or a complex salt of iron or copper.

17. The process of claim 15 wherein the free radical inhibitor is a compound selected from the group consisting of allyl alcohol, catechol, 1,10-orthophenanthrolene, butene-1, 4-diol, phenol, resorcinol, and hydroquinone.

18. The process of claim 1 wherein the hydratable polymeric material is a compound selected from the group consisting of hydratable polysaccharides, polyacrylamides, and polyacrylamide copolymers.

* * * * *

UNITED STATES PATENT AND TRADEMARK OFFICE
CERTIFICATE OF CORRECTION

PATENT NO. : 4,591,443

DATED : May 27, 1986

INVENTOR(S) : Richard A. Brown and Robert D. Norris

It is certified that error appears in the above—identified patent and that said Letters Patent is hereby corrected as shown below:

Column 1, line 7, "contaminent" should read --contaminant--; line 15, "carbons, alcohos, alcohols," should read --carbons, alcohols--; line 18, "the the groundwater" should read --the groundwater--; line 20, "limitec" should read --limited--; line 53, "quantitites" should read --quantities--. Column 3, line 27, "galactomanan" should read --galactomannan--. Column 4, line 50, "polymerial" should read --polymeric--. Column 5, line 17, "9-10-orthophenanthroline," should read --1,10-orthophenanthroline--; line 42, "contaminanted" should read --contaminated--. Column 7, line 20, "$Na_2HPO_4$," should read --$Na_2HPO_4$, 1--; line 54, "supernatent" should read --supernatant--. Column 8, line 7, "wells/or" should read --wells or--. Column 10, line 66, "Tne" should read --The--; line 68, "positin" should read --position--. Column 11, line 8, "awueous" should read --aqueous--; line 5, "1,10-orthophenanthrolene," should read --1,10-orthophenanthroline--. Column 12, line 1, "salt a copper" should read --salt, a copper--; lines 5-6, "1,10-orthophenanthrolene" should read --1,10-orthophenanthroline--.

Signed and Sealed this

Twenty-sixth Day of August 1986

[SEAL]

Attest:

DONALD J. QUIGG

Attesting Officer

Commissioner of Patents and Trademarks